US006230483B1

(12) United States Patent
Sakon et al.

(10) Patent No.: US 6,230,483 B1
(45) Date of Patent: May 15, 2001

(54) STEAM COOLED TYPE GAS TURBINE

(75) Inventors: Toshio Sakon; Tadayoshi Endo, both of Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/220,686

(22) Filed: Dec. 23, 1998

(30) Foreign Application Priority Data

Dec. 24, 1997 (JP) .................................................. 9-354953

(51) Int. Cl.[7] ........................................................ F02C 7/18
(52) U.S. Cl. ............................................ 60/39.75; 415/114
(58) Field of Search .............................. 60/39.07, 39.182, 60/39.75; 415/114

(56) References Cited

U.S. PATENT DOCUMENTS

| | | | | |
|---|---|---|---|---|
| 4,507,914 | * | 4/1985 | Rice | 415/114 |
| 5,253,976 | * | 10/1993 | Cunha | 415/114 |
| 5,640,840 | | 6/1997 | Briesch . | |
| 5,819,525 | * | 10/1998 | Gaul et al. | 60/39.75 |

FOREIGN PATENT DOCUMENTS

| | | |
|---|---|---|
| 0690205A2 | 1/1996 | (EP) . |
| 0735243A2 | 10/1996 | (EP) . |
| 8-284687 | 10/1996 | (JP) . |
| 99 40305 | 12/1999 | (WO) . |

OTHER PUBLICATIONS

PATENT ABSTRACT OF JAPAN, vol. 1998, no. 08, Jun. 30, 1998 & JP 10061457A (MITSUBISHI HEAVY IND LTD), Mar. 3, 1998.

* cited by examiner

*Primary Examiner*—Louis J. Casaregola
(74) *Attorney, Agent, or Firm*—Wenderoth, Lind & Ponack, L.L.P.

(57) ABSTRACT

A steam cooled type gas turbine has a steam chamber unit formed in one unit having a compact structure through which steam, as a cooling medium, is appropriately supplied, used for cooling and recovered. The steam chamber unit (1) formed in one unit has a steam supply passage (31) for leading cooling steam, a steam connection passage (32) for leading the cooling steam which has cooled a front stage (5) to a subsequent stage (6) and a steam recovery passage (33) for recovering the cooling steam which has cooled a plurality of the stages. The unit further has a heat insulating structural member (8) for insulation of heat from a moving blade (9) and a stationary blade supporting portion (7), both provided in an inner circumferential surface portion of the steam chamber unit. Supply and recovery of steam to and from stationary blades and cooling by steam of stationary blades can be done with a compact structure having a single consecutive cooling steam passage so that the stationary blades can be cooled efficiently.

9 Claims, 3 Drawing Sheets

STEAM COOLED TYPE GAS TURBINE

BACKGROUND OF THE INVENTION

1. Field of the Invention

The present invention relates to a steam cooled type gas turbine in which steam is used as a gas turbine cooling medium.

2. Description of the Prior Art

As one example of a prior art gas turbine cooling structure, cooling of an air cooled type stationary blade will be outlined with reference to FIG. 4.

In a gas turbine having a system to cool a high temperature portion using air as a cooling medium, cooling air is led from a stationary blade outer shroud side as shown by arrows a. A portion of the air so led flows in the blade for cooling of an inner surface thereof and then flows out of holes provided in the blade to flow along the blade surface for cooling thereof as shown by arrows b, and is discharged in a combustion gas passage as shown by arrows e.

A remaining portion of the air does not flow out of the holes provided in the blade but is led into a stationary blade inner shroud for cooling of the inner shroud and a blade lower portion and then flows as shown by arrow c to be discharged into the combustion gas passage.

In the above, in order to prevent the air so led as shown by arrows a from leaking directly into the combustion gas passage before it performs its original duty to cool the blade portion and the blade lower portion, there are provided seals d at contact surfaces between the blade and the outer shroud and between the blade and the inner shroud.

As mentioned above, in the air cooled type gas turbine, after the air as cooling medium has cooled the structural body of the stationary blade, shrouds, etc., it is discharged into the combustion gas passage without being recovered, hence there is less thermal efficiency in this system.

Thus, as part of a recent tendency to obtain a better system in thermal efficiency, a steam cooled type gas turbine has been disclosed as another prior art example in which steam is used as the cooling medium in place of air.

As to this prior art example, although illustration is omitted, steam as a cooling medium is supplied into portions to be cooled of the gas turbine, including the structural body of the stationary blade, shrouds, etc., and the steam which has been heated through cooling of the cooled portions is recovered so that the heat of the steam is utilized effectively and enhancement of the thermal efficiency can be attained.

In this steam cooled system, however, in order to ensure recovery of the heat obtained in the cooled portions, there is needed an accurate and strong construction of cooling passages in which the steam does not leak, not only into the combustion gas passage, but also along the way of steam flow passages.

Hence, in the steam cooled system, construction thereof is preferably such that steam supply ports and recovery ports are lessened to the extent possible, and stationary blades of a first stage, second stage and subsequent stages are supplied with the cooling steam for cooling thereof through a single steam passage, and then the steam is recovered.

SUMMARY OF THE INVENTION

Based on such a view point, it is an object of the present invention to provide a steam cooled type gas turbine comprising a steam chamber unit having a compact structure by which a cooling steam can be appropriately supplied, used for cooling and recovered.

In order to achieve the object, the present invention provides a steam cooled type gas turbine characterized in comprising a steam chamber unit which is formed in one unit having therein a steam supply passage for leading thereinto a cooling steam, a steam connection passage for leading therethrough the cooling steam which has cooled a front stage to a subsequent stage, and a steam recovery passage for recovering therethrough the cooling steam which has cooled a plurality of the stages. The unit further has a heat insulating structural member for insulation of heat from a moving blade and a stationary blade supporting portion, both provided in an inner circumferential surface portion in a turbine radial direction of the steam chamber unit.

According to this invention, the steam chamber unit is formed in one unit integrally having therein three passages including the steam supply passage, the steam connection passage and the steam recovery passage, as well as having the heat insulating structural member and the stationary blade supporting portion. The process of supply and recovery of the cooling steam and cooling by the cooling steam of the stationary blade cooled portion can thereby be appropriately done by a compact structure so that the stationary blade is cooled effectively and a highly economical and reliable gas turbine can be obtained.

Also, the present invention provides a steam cooled type gas turbine as mentioned above, characterized in that a consecutive cooling passage is formed by the steam supply passage, steam connection passage the and the steam recovery passage, each being connected to a stationary blade cooling steam passage via a branch pipe having an opening to open to the respective steam passages.

According to this invention, the steam supply passage, steam connection passage and steam recovery passage for leading therethrough the cooling steam are connected to the stationary blade cooling steam passage provided in the stationary blade via the branch pipe, whereby a single consecutive cooling steam passage having a compact structure is completed and the process of supply and recovery of the cooling steam and cooling by the cooling steam can be done appropriately by that single consecutive passage, and a highly economical and reliable gas turbine can be obtained.

Further, the present invention provides a steam cooled type gas turbine as mentioned above, characterized in that the branch pipe is formed in a hollow bolt-like member having a threaded portion and is fixed to a fitting portion in the steam chamber unit via the threaded portion.

According to this invention, the branch pipe for connecting the steam supply passage, steam connection passage and steam recovery passage to the stationary blade cooling steam passage is formed in the bolt-like member, and this bolt-like member is fixed to the steam chamber unit via the threaded portion, whereby the entire construction of the passages is made in a further compact form and a highly economical and reliable gas turbine can be obtained.

Also, the present invention provides a steam cooled type gas turbine as mentioned above, characterized in that the branch pipe is formed in a hollow pipe-like member having a flange at its top portion and is fixed to a fitting portion in an outer circumferential surface portion in the turbine radial direction of the steam chamber unit via the flange.

According to this invention, the branch pipe for connecting the steam supply passage, steam connection passage and steam recovery passage to the stationary blade cooling steam passage is formed in the pipe-like member having the flange, instead of the bolt-like member, and this pipe-like member is fixed to the steam chamber unit via the flange, whereby the entire construction of the passages is made in a likewise compact form and a highly economical and reliable gas turbine can be obtained.

Furthermore, the present invention provides a steam cooled type gas turbine as mentioned in any one of the above inventions, characterized in that there are provided a steam supply pipe connected to the steam supply passage for supplying therethrough the cooling steam into a portion of a combustor to be cooled and a steam recovery pipe connected to the steam connection passage for recovering therethrough the cooling steam from the portion of the combustor to be cooled.

According to this invention, in a case where the cooling of the gas turbine is to be made not only for the stationary blade but also for the combustor, the portion of the combustor to be cooled is connected to the steam supply passage in the steam chamber unit via the steam supply pipe and to the steam connection passage in the steam chamber unit via the steam recovery pipe so that, not only the stationary blade, but also the combustor, can be cooled, and the entire construction of the passages is made in a compact form and a highly economical and reliable gas turbine can be obtained.

DESCRIPTION OF THE PREFERRED EMBODIMENTS

A first embodiment according to the present invention will be described with reference to FIG. 1.

Figure 1:
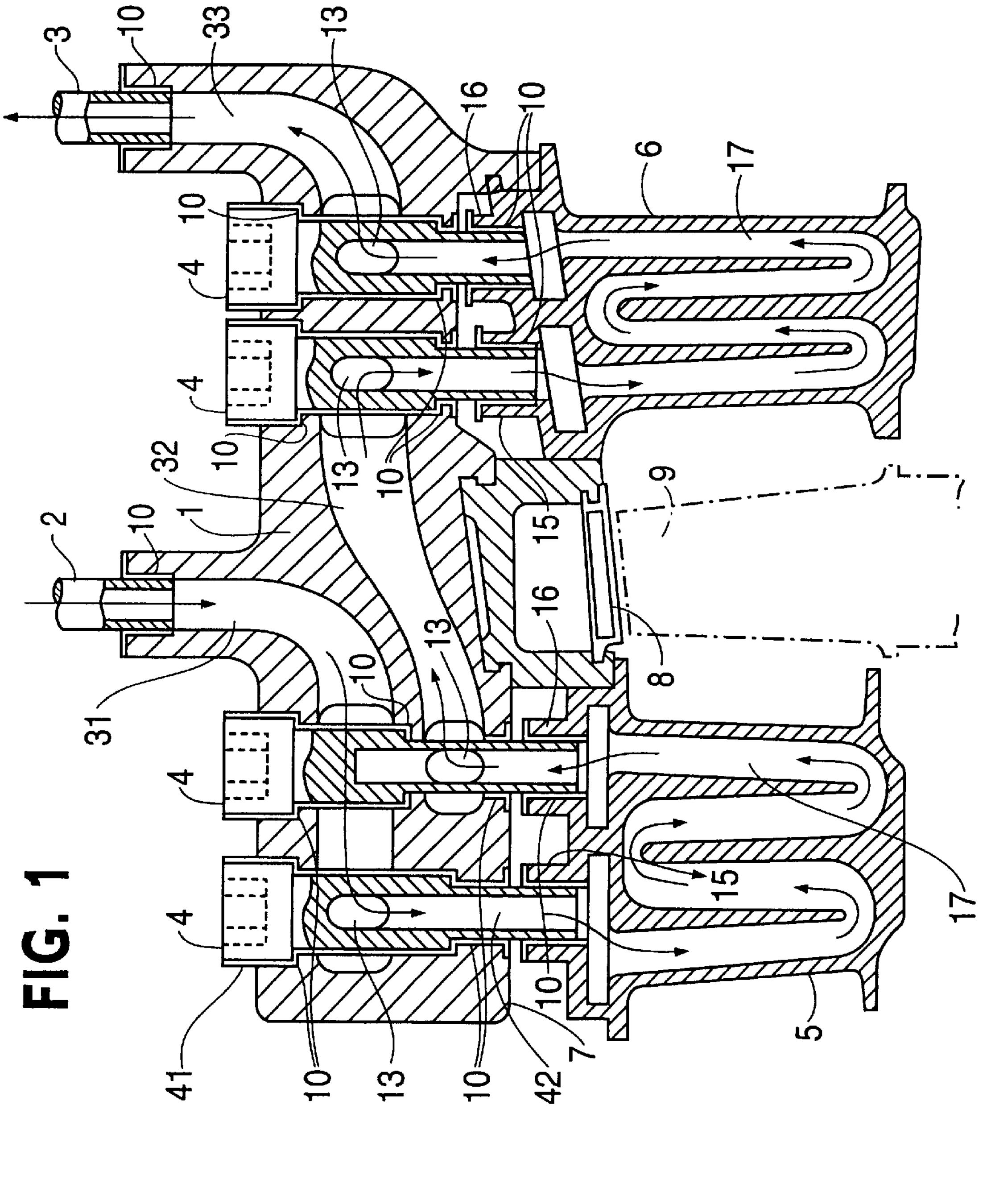
FIG. 1 is a schematic cross sectional view showing a main part of a steam cooled type gas turbine of a first embodiment according to the present invention.

In FIG. 1, numeral 1 designates a steam chamber unit. This steam chamber unit 1 is an integral structural body formed in one unit which is usually made by casting or welding and therein formed are a steam supply passage 31, a steam connection passage 32 and a steam recovery passage 33. There are also provided, in an inner circumferential surface portion thereof and in a turbine radial direction, a heat insulating structural member 8 opposing an outer circumferential portion of a moving blade 9 for insulation of heat from the moving blade 9 and a supporting portion 7 supporting each of a front stage stationary blade 5 and a rear stage stationary blade 6.

Numeral 2 designates an inlet pipe of cooling steam and numeral 3 designates an outlet pipe of the same. The inlet pipe 2 connects to an upstream end of the steam supply passage 31 of the steam chamber unit 1 and the outlet pipe 3 connects to a downstream end of the steam recovery passage 33 of same. A high pressure exhaust steam from a steam turbine (not shown) or steam from a boiler (not shown), etc. is supplied into the inlet pipe 2 as cooling steam. Recovered cooling steam is supplied into a reheating portion of boiler or a downstream intermediate pressure steam turbine, etc. (not shown) via the outlet pipe 3.

Numeral 4 designates a bolt-like member which corresponds to what is called a branch pipe. In a nearly upper half portion of an entire length of a fitting portion in the steam chamber unit 1 into which the bolt-like member 4 is inserted, there is provided a threaded portion 41 so as to stride over a stepped portion of the fitting portion. Also, in a nearly lower half portion of an entire length of the bolt-like member 4, there is bored a hollow hole 42. At an upper end portion of the hollow hole 42 of the bolt-like member 4, there is provided an opening window 13 which has an opening directed outwardly.

The bolt-like member 4 is provided in two pieces for each of the front stage stationary blade 5 and the rear stage stationary blade 6. One of the two bolt-like members 4 corresponding to the front stage stationary blade 5 has the opening window 13 opening to the steam supply passage 31 and the hollow hole 42 connecting to a steam inlet nozzle 15 at an upstream end of a cooling steam passage 17 formed in the front stage stationary blade 5, and the other thereof has the opening window 13 opening to the steam connection passage 32 and the hollow hole 42 connecting to a steam outlet nozzle 16 at a downstream end of the cooling steam passage 17 formed in the front stage stationary blade 5.

Likewise, as to the two bolt-like members 4 corresponding to the rear stage stationary blade 6, one of them has the opening window 13 opening to the steam connection passage 32 and the hollow hole 42 connecting to a steam inlet nozzle 15 at an upstream end of a cooling steam passage 17 formed in the rear stage stationary blade 6, and the other thereof has the opening window 13 opening to the steam recovery passage 33 and the hollow hole 42 connecting to a steam outlet nozzle 16 at a downstream end of the cooling steam passage 17 formed in the rear stage stationary blade 6.

Thus, roughly, with details being omitted, there is formed between the inlet pipe 2 and the outlet pipe 3 a single consecutive cooling passage having the steam supply passage 31, the bolt-like member 4, the cooling steam passage 17, the bolt-like member 4, the steam connection passage 32, the bolt-like member 4, the cooling steam passage 17, the bolt-like member 4 and the steam recovery passage 33, in this order.

It is to be noted that numeral 10 designates a seal, which is interposed in portions in FIG. 1 which are blacked solidly, for example, portions where no threaded portion is formed of the fitting portion of the steam chamber unit 1 into which the bolt-like member 4 is fitted, connection portions between the bolt-like member 4 and the steam inlet nozzle 15 or the steam outlet nozzle 16, and connection portions between the steam chamber unit 1 and the inlet pipe 2 or the outlet pipe etc. The construction is made such that there occurs no substantial leakage of the cooling steam from the cooling passage from the inlet pipe 2 to the outlet pipe 3.

That is, in the present embodiment, the steam chamber unit 1 of the integral structure comprises therein the steam supply passage 31, the steam connection passage 32 and the steam recovery passage 33, and also comprises in its inner circumferential surface portion in the turbine radial direction the heat insulating structural member 8 and the supporting portions 7 of the front stage and rear stage stationary blades 5, 6. A plurality of each of the front stage and rear stage stationary blades 5, 6 are set at predetermined respective positions along the inner circumferential surface portion of the steam chamber unit 1 and then, while a plurality of the seals 10 are being fitted, a plurality of the bolt-like members 4 are inserted in the turbine radial direction from an outer circumferential side of the steam chamber unit 1 to be fixed via the threaded portion 41 so that lower end portions of the bolt-like members 4 are jointed to the steam inlet nozzle 15 and the steam outlet nozzle 16, respectively.

According to the present embodiment, there is formed the consecutive steam flow passage by the steam chamber unit 1 of the integral structure, the bolt-like member 4 inserted thereinto, the cooling steam passages 17 of the front and rear stage stationary blades 5, 6 and the steam passages 31, 32, 33, whereby a smooth and secure cooling of the gas turbine stationary blade can be achieved.

Further, the various steam flow passages are made in a simple structure such that the steam chamber unit 1 is made integrally in one unit by casting or welding. After the front and rear stage stationary blades 5, 6 are set along the inner circumferential surface portion of the steam chamber unit 1, the seals 10 are fitted and the bolt-like members 4 are inserted from the outer circumferential side of the steam chamber unit 1 so that steam inlets and outlets of the respective stationary blades 5, 6 are formed and the steam which has cooled all the stationary blades is gathered in one place to be recovered from the outlet pipe 3 securely. Thereby, the steam which has entered the inlet pipe 2 is ensured to flow into and out of the respective front and rear stationary blades 5, 6 and there occurs no fear of leakage of the steam into the combustion gas passage.

It is to be noted that, while the bolt-like member 4, which corresponds to the branch pipe as mentioned before, forms a steam flow passage between the corresponding steam passage in the steam chamber unit 1 and the corresponding stationary blade, the length of the hollow hole 42 of the bolt-like member 4 and the position of the opening window 13 for connecting the hollow hole 42 to the corresponding steam passage may be changed and adjusted according to the position of the steam inflow and outflow.

Figure 2:
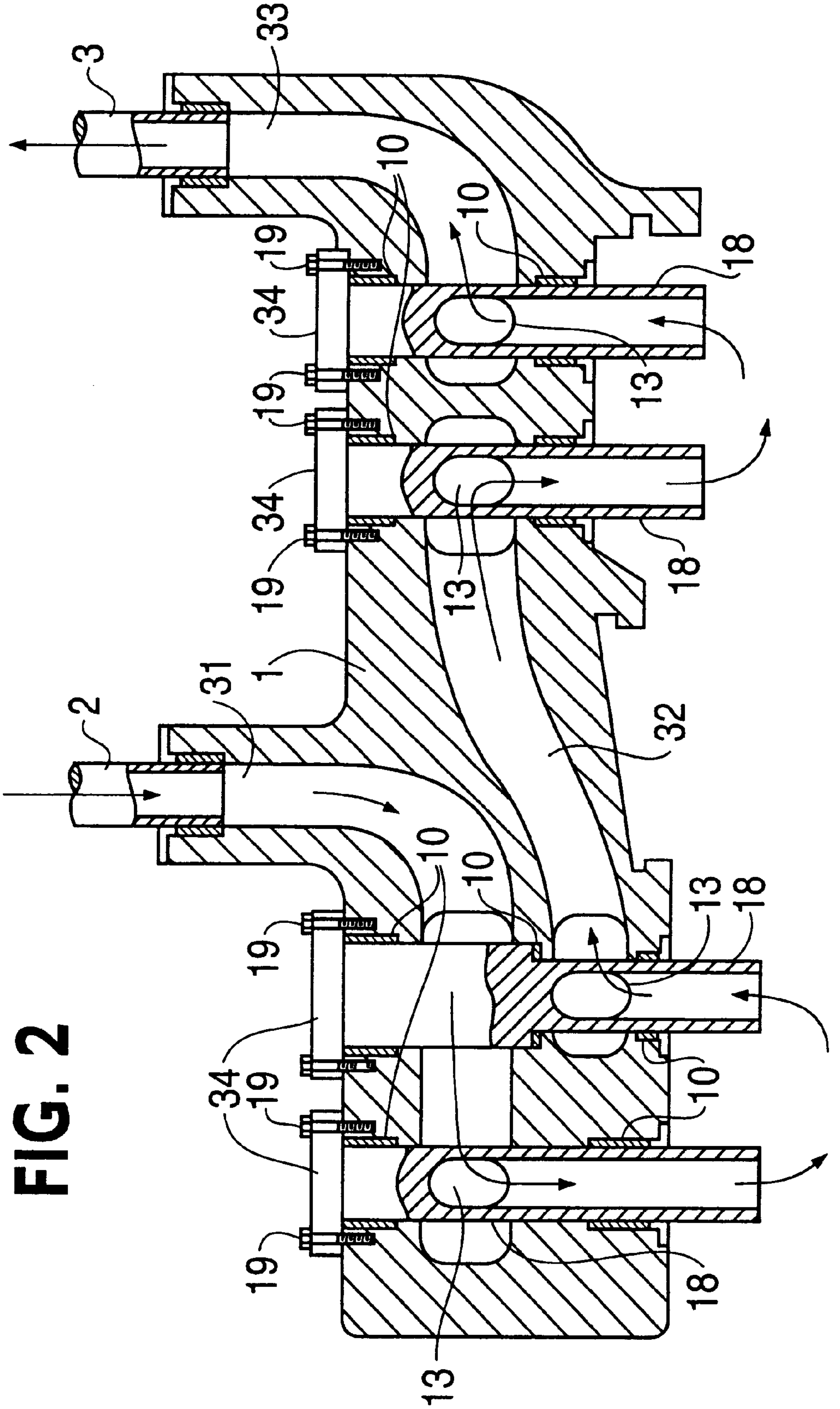
FIG. 2 is a schematic cross sectional view showing a main part of a steam cooled type gas turbine of a second embodiment according to the present invention.

Next, a second embodiment according to the present invention will be described with reference to FIG. 2. It is to be noted that the same parts as those in the first embodiment are given the same reference numerals in the figure, with repeated description being omitted.

That is, in the present embodiment, a pipe-like member 18 which has a flange 34 at its top portion is used in place of the bolt-like member 4 in the first embodiment and this pipe-like member 18 performs the same function of the branch pipe to lead the cooling steam into the predetermined passages.

In this case, while the bolt-like member 4 of the first embodiment is fixed to the steam chamber unit 1 via the threaded portion 41, the pipe-like member 18 of the present embodiment is fixed to the steam chamber unit 1 by the flange 34 being fixed to the steam chamber unit 1 via a fixing bolt 19.

According to the so constructed present embodiment, assembling and fixing of the pipe-like member 18 to the steam chamber unit 1 are facilitated, thereby obtaining an advantage of compactness in all aspects of design, manufacture, assembly, maintenance and inspection, etc.

Next, a third embodiment according to the present invention will be described with reference to FIG. 3. The present embodiment is made on the basis of the first or second embodiment, with the addition of a partial structure so as to further enhance the function of the basic construction.

Figure 3:
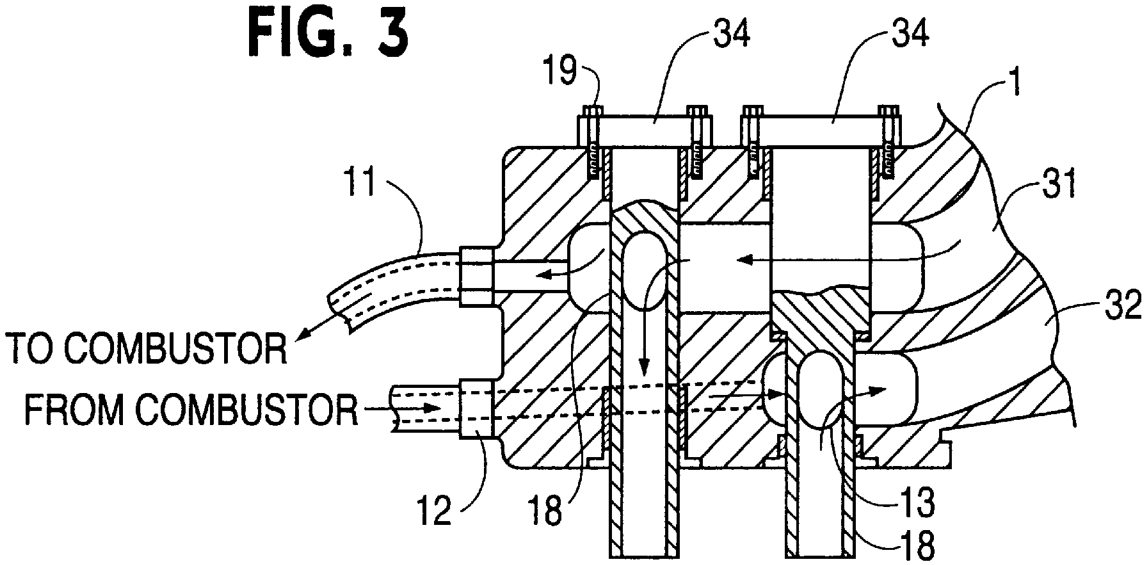
FIG. 3 is a schematic cross sectional view showing a main part of a steam cooled type gas turbine of a third embodiment according to the present invention.
Figure 4:
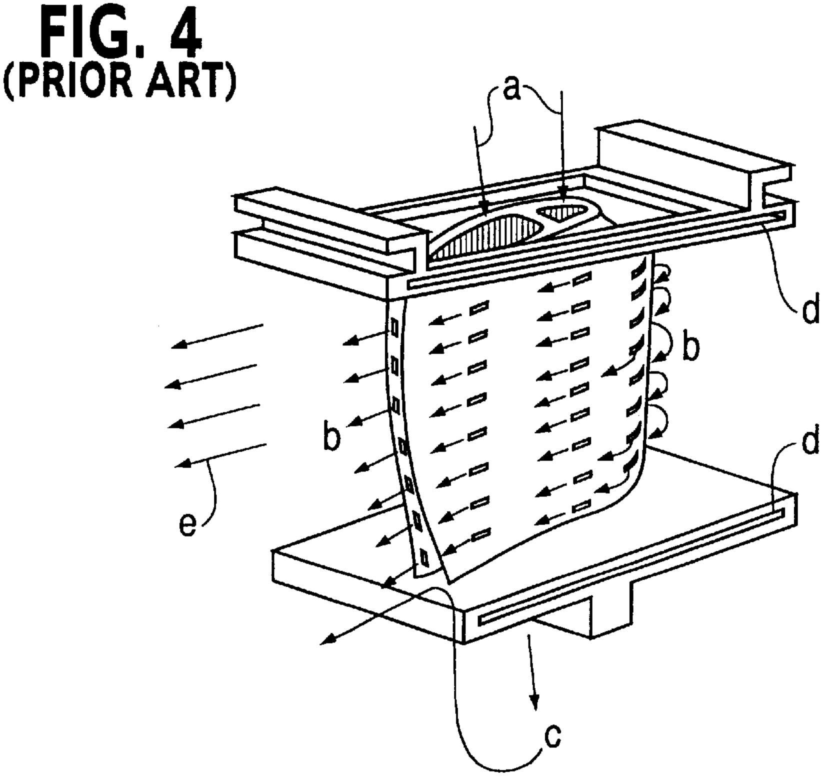
FIG. 4 (PRIOR ART)
FIG. 4 is a perspective view showing one example of a prior art gas turbine stationary blade cooling structure.

FIG. 3 shows an embodiment made on the basis of the second embodiment, wherein there are provided a combustor cooling steam supply pipe 11 being connected to a downstream portion of the steam supply passage 31 in the steam chamber unit 1 for supplying therethrough a cooling steam to a combustor (not shown) and a combustor cooling steam recovery pipe 12 being connected to the steam connection passage 32 in the steam chamber unit 1 for recovering therethrough the cooling steam from said combustor.

According to the present embodiment, as the portions to be cooled of the gas turbine, not only the stationary blade portion but also the combustor portion, for example, a combustor tail tube portion, can be cooled together and still a cooling structure thereof can be made in a very compact form.

The construction, function and effect of other portions of the third embodiment are substantially the same as those of the preceding embodiments, especially of the second embodiment, and the same parts of the third embodiment as those in the second embodiment are given the same reference numerals in FIG. 3, with repeated description being omitted.

The invention has been described with respect to the embodiments as illustrated, but the invention is not limited to the embodiments, and may be have with various modifications in the concrete structure within the scope of the invention as claimed herebelow.

What is claimed is:

1. A steam cooled gas turbine, comprising:

a plurality of stages of stationary blades and moving blades between said stationary blades, said stationary blades including a forward stage and a subsequent stage and said moving blades being located between said forward stage and said subsequent stage;

a unitary steam chamber unit surrounding said stationary blades and moving blades, said steam chamber unit comprising a steam supply passage therein for conducting cooling steam toward a stationary blade of said forward stage, a steam connection passage for conducting the cooling steam toward a stationary blade of said subsequent stage, and a steam recovery passage for recovering the cooling steam which has been supplied into said stationary blade of said subsequent stage, and said unitary steam chamber unit having a heat insulating structural member arranged radially outward of said moving blades and a stationary blade supporting portion arranged so as to confront an outer circumference of at least one of said stationary blades.

2. The steam cooled gas turbine of claim 1, wherein a pair of tubular members fix one of said stationary blades to said stationary blade supporting portion, one tubular member of said pair having an opening window and an inner hollow portion arranged so as to communicate said steam supply passage to the one of said stationary blades for conducting the cooling steam thereto and the other tubular member of said pair having an inner hollow portion and an opening window arranged so as to communicate the one of said stationary blades with said steam connection passage for conducting the cooling steam which has cooled the one of said stationary blades to said steam connection passage.

3. The steam cooled gas turbine of claim 2, wherein each tubular member of said pair of tubular members comprises a threaded portion fixing said tubular member to said steam chamber unit.

4. The steam cooled gas turbine of claim 2, wherein each tubular member of said pair of tubular members comprises a flange at a top portion thereof fixing said tubular member to an outer circumferential surface of said steam chamber unit.

5. The steam cooled gas turbine of claim 1, wherein a steam supply pipe is connected to said steam supply passage for supplying the cooling steam therethrough into a portion of a combustor to be cooled and a steam recovery pipe is connected to said steam connection passage for recovering therethrough the cooling steam from the portion to be cooled of the combustor.

6. The steam cooled gas turbine of claim 2, wherein a steam supply pipe is connected to said steam supply passage for supplying the cooling steam therethrough into a portion of a combustor to be cooled and a steam recovery pipe is connected to said steam connection passage for recovering therethrough the cooling steam from the portion to be cooled of the combustor.

7. The steam cooled gas turbine of claim 3, wherein a steam supply pipe is connected to said steam supply passage for supplying the cooling steam therethrough into a portion of a combustor to be cooled and a steam recovery pipe is connected to said steam connection passage for recovering therethrough the cooling steam from the portion to be cooled of the combustor.

8. The steam cooled gas turbine of claim 4, wherein a steam supply pipe is connected to said team supply passage for supplying the cooling steam therethrough into a portion of a combustor to be cooled and a steam recovery pipe is connected to said steam connection passage for recovering therethrough the cooling steam from the portion to be cooled of the combustor.

9. The steam cooled gas turbine of claim 1, wherein said steam supply passage and an upstream end of said steam connection passage are fluidly connected to upstream and downstream ends of a fluid passage of said forward stage and said steam connection passage and said steam recovery passage are fluidly connected to upstream and downstream ends of a fluid passage of said subsequent stage, whereby said steam supply passsage, said fluid passage of said forward stage, said steam connection passage, said fluid passage of said subsequent stage and said steam recovery passage form a serial cooling passage.

* * * * *